US008996546B2

(12) United States Patent
Headd et al.

(10) Patent No.: US 8,996,546 B2
(45) Date of Patent: Mar. 31, 2015

(54) INTERNET BASED RESOURCE RETRIEVAL SYSTEM

(76) Inventors: Travis L. Headd, Oklahoma City, OK (US); Craig S. Callaway, Edmond, OK (US)

(*) Notice: Subject to any disclaimer, the term of this patent is extended or adjusted under 35 U.S.C. 154(b) by 435 days.

(21) Appl. No.: 11/137,888

(22) Filed: May 26, 2005

(65) Prior Publication Data

US 2005/0267893 A1    Dec. 1, 2005

Related U.S. Application Data

(60) Provisional application No. 60/575,546, filed on May 28, 2004.

(51) Int. Cl.
G06F 7/00        (2006.01)
G06F 17/30       (2006.01)

(52) U.S. Cl.
CPC ................. *G06F 17/3087* (2013.01)
USPC ....................... 707/758; 705/14.58

(58) Field of Classification Search
USPC ........................................ 707/10, 3
See application file for complete search history.

(56) References Cited

U.S. PATENT DOCUMENTS 5,483,586 A * 1/1996 Sussman .................. 379/218.01
5,737,533 A   4/1998 de Hond
5,812,776 A * 9/1998 Gifford ........................ 709/217

(Continued)

FOREIGN PATENT DOCUMENTS

JP    2003-108591        11/2003
WO    WO 0003332    *   1/2000
WO    WO 03/058524       7/2003

OTHER PUBLICATIONS

Nobuyuki Miura, et.al., "Mobile Info Search: User-Centered Search Mechanism of WWW in Mobile Environment", Information Processing Society of Japan, SIG Notes, Dec. 4, 1997, vol. 97, No. 117, pp. 33-38.

(Continued)

*Primary Examiner* — Augustine K Obisesan
(74) *Attorney, Agent, or Firm* — Dunlap Codding P.C.

(57) ABSTRACT

A resource retrieval system comprises a server having a searchable database wherein users can readily access region-based publications similar to, but not necessarily limited to, printed telephone directories. The resource retrieval system communicates with at least one user system, preferably via the Internet. In one embodiment, the server is accessed by the user system via an icon, which initiates an interactive interface wherein the user can "point and click" to a geographic area so as to further narrow the searchable field until arriving at a "virtual phone book," or an electronic replica of an actual or physical telephone directory for a desired geographic region. Preferably, the replicated telephone directory is displayed in a manner so as to digitally or electronically replicate the traditional format of the physical telephone directory. Further, the replicated telephone directory can be further searched or accessed in a relative manner common with the use of the physical telephone directory while allowing for additional capabilities currently not found or available in print directories. In one embodiment, the present invention also includes interactive features which the user can utilize to access Internet addresses (e.g., webpage addresses) and/or telephone numbers provided within the content of the printed telephone directory.

7 Claims, 7 Drawing Sheets

(56) References Cited

U.S. PATENT DOCUMENTS

| | | | |
|---|---|---|---|
| 5,850,433 A * | 12/1998 | Rondeau | 379/218.01 |
| 5,852,810 A * | 12/1998 | Sotiroff et al. | 705/27 |
| 5,930,474 A * | 7/1999 | Dunworth et al. | 709/217 |
| 5,933,822 A * | 8/1999 | Braden-Harder et al. | 707/5 |
| 5,946,687 A * | 8/1999 | Gehani et al. | 707/10 |
| 6,002,853 A | 12/1999 | de Hond | |
| 6,049,796 A * | 4/2000 | Siitonen et al. | 707/3 |
| 6,052,439 A | 4/2000 | Gerszberg et al. | |
| 6,141,413 A * | 10/2000 | Waldner et al. | 379/88.17 |
| 6,189,003 B1 * | 2/2001 | Leal | 707/2 |
| 6,208,998 B1 * | 3/2001 | Marcus | 707/104.1 |
| 6,353,398 B1 * | 3/2002 | Amin et al. | 340/995.12 |
| 6,377,961 B1 * | 4/2002 | Ryu | 1/1 |
| 6,570,974 B1 | 5/2003 | Gerszberg et al. | |
| 6,577,717 B1 * | 6/2003 | Henon | 379/114.01 |
| 6,643,640 B1 | 11/2003 | Getchius | |
| 6,665,676 B2 | 12/2003 | Twig et al. | |
| 6,691,015 B1 * | 2/2004 | Levine | 701/70 |
| 6,735,585 B1 * | 5/2004 | Black et al. | 1/1 |
| 6,788,769 B1 * | 9/2004 | Waites | 379/93.24 |
| 6,938,051 B1 * | 8/2005 | Burger et al. | 707/104.1 |
| 6,980,991 B2 * | 12/2005 | Newsteder | 707/770 |
| 6,999,444 B1 * | 2/2006 | Nitta et al. | 370/338 |
| 7,013,299 B1 * | 3/2006 | Sherwood | 707/3 |
| 7,080,079 B2 * | 7/2006 | Yu | 707/10 |
| 7,089,264 B1 | 8/2006 | Guido et al. | |
| 7,251,234 B2 * | 7/2007 | Warmus et al. | 370/338 |
| 2002/0002552 A1 | 1/2002 | Schultz et al. | |
| 2002/0087408 A1 * | 7/2002 | Burnett | 705/14 |
| 2003/0191852 A1 * | 10/2003 | Incertis | 709/232 |
| 2004/0030490 A1 * | 2/2004 | Hegedus et al. | 701/200 |
| 2004/0064334 A1 * | 4/2004 | Nye | 705/1 |
| 2004/0176974 A1 | 9/2004 | Twig et al. | |
| 2004/0190695 A1 | 9/2004 | Parker | |
| 2004/0214554 A1 * | 10/2004 | Binning et al. | 455/414.1 |
| 2004/0260604 A1 * | 12/2004 | Bedingfield, Sr. | 705/14 |
| 2005/0114292 A1 * | 5/2005 | Wesinger et al. | 707/1 |
| 2005/0120006 A1 * | 6/2005 | Nye | 707/3 |

OTHER PUBLICATIONS

Translation of an Office Action of JPO, Dispatch Date: Sep. 14, 2010.

* cited by examiner

INTERNET BASED RESOURCE RETRIEVAL SYSTEM

CROSS-REFERENCE TO RELATED APPLICATIONS

The present application claims priority to the provisional patent application identified by the U.S. Ser. No. 60/575,546, which was filed on May 28, 2004, the entire content of which is hereby expressly incorporated herein by reference.

STATEMENT REGARDING FEDERALLY SPONSORED RESEARCH OR DEVELOPMENT

Not applicable.

BACKGROUND OF THE INVENTION

1. Field of the Invention

In general, the present invention relates to a resource retrieval system. More specifically, but not to be considered limiting, the present invention relates to an Internet based resource retrieval system which allows for users to search, retrieve, view and use information currently found in various print directories, such as physical phone books or telephone directories.

2. Applicants' Statement Regarding the Known Prior Art

Although the Internet has become a primary resource for information, it currently has numerous limitations due to the standard and favored means of information retrieval currently employed by search engines, especially with regards to geographical searching. For example, a consumer who wants to find a nearby or "local" business to fix a flat tire, get an estimate for a roof repair, order flowers, or make a restaurant reservation would find using the Internet as a possibly confusing resource due to the availability of numerous "hits" by retailers who may not necessarily be a "local" business. Many search engines list non-local businesses even in a relatively narrow search due to the now common practice of businesses paying for location preference on search engines. In addition to the different search methodology involved, the format in which the contents of the directories are displayed using the Internet is often different in form than that of the traditional printed form of the directories.

Therefore, consumers still find the format and presentation of the "old fashioned" print directories, such as those often issued or published by telephone companies, utilities, or other independent "yellow" or "white" pages, to be preferable when attempting to find a local or specific geographical business. Further, there are still individuals, retailers, and other businesses that advertise in the aforementioned print directories that do not advertise on the Internet. Also, such advertisements may include valuable information not generally found in Internet sources, such as for example a date of establishment or years in business, whether the business is "locally owned and operated," specialities or services offered, hours of operation, payment methods accepted, or specific pricing. Further, such entities may include coupons or discounts in the print directories which the consumer can use locally.

Another problem that exists is that to Applicants' knowledge there is no one resource where consumers can easily obtain access to the multiple directories that are available for any given market or area. The multiple directories available in a given market are typically provided by different publishers or sources. While some of the print directories or contents thereof may be accessible via the Internet via an individual publisher, there is not believed to be a current system or means to readily identify all the directories available (on a local, national, international or worldwide basis), or identify where the available print directories can be accessed on the Internet. For example, if a consumer wanted to view via the Internet a local phone book for a specific area, such as a specific city, they would be hampered if they did not know 1) what types of directories are available for the city, 2) which source or sources provide the directories available for the city, 3) whether a directory is available by the specific name or title of the directory or by the name of the source, and/or 4) whether the directory is complete, accurate and current. Even if the consumer was familiar with the general area, the consumer may still not be aware what suburbs or outlying areas in which the directories apply or are available for. Such problems are even more evident if the consumer wants to locate a directory in a remote region, such as a city in a foreign country.

In the current global market, where information may be too abundant and or unusable, access to timely and specific information is still a critical component to success, improved operations, and consumer satisfaction. Although there are numerous business services, databases, and networks available, there is a continuing need to provide an effective and efficient system for collecting, storing, searching, and displaying information, especially information which is applicable to specific geographic areas such as telephone directories (e.g., the "white pages" or "yellow pages"). It is to such a system, and methods of implementing and using the same, that the present invention is directed.

SUMMARY OF THE INVENTION

In general, the present invention relates to a resource retrieval system for providing catagorizeable publications in an electronic format. More particularly, the present invention relates to a resource retrieval system for providing a plurality of publications which are categorizeable by region, or region-based publications. In one embodiment, the plurality of region-based publications are telephone directories. As such, one embodiment of the present invention provides a "virtual phone book" system. Further, the telephone directories are preferably collected from different sources from different countries so that a more diverse and more complete collection of telephone directories are made available to the user on a worldwide bases.

In one embodiment of the present invention, the resource retrieval system comprises a server having a searchable database wherein users or subscribers can readily access region-based publications similar to, but not necessarily limited to, printed telephone directories. Further, the present invention preferably includes an icon or other computer desktop friendly access means that allows a user to directly and instantaneously access the server from a user system. Thus, one icon leads to all telephone directories stored on the server, which can then be searched and viewed by the user.

In one embodiment, the server provides the user with an interactive interface wherein the user can "point and click" to a geographic area so as to further narrow the searchable field until arriving at an electronic replica of an actual or physical telephone directory for a desired geographic region. Further, it is contemplated that the replicated telephone directory can be further searched or accessed in a relative manner common with the use of the physical telephone directory. To provide such a capability, the interface can include searching tools which reflect, mimic, or copy common headings or categories associated with the traditional print directory. In addition, the computational aspect of the present invention allows for other functionality and searching capabilities currently not found or available in traditional print directories. For example, in one embodiment, the present invention includes interactive features which the user can utilize to directly access Internet addresses (e.g., webpage addresses) and/or telephone numbers provided within the content of the printed telephone directory.

These, together with other objects and various features of novelty which characterize the invention, are discussed and illustrated in further detail herein, and are pointed out with particularity in the claims.

DETAILED DESCRIPTION OF THE INVENTION

Figure 1A:
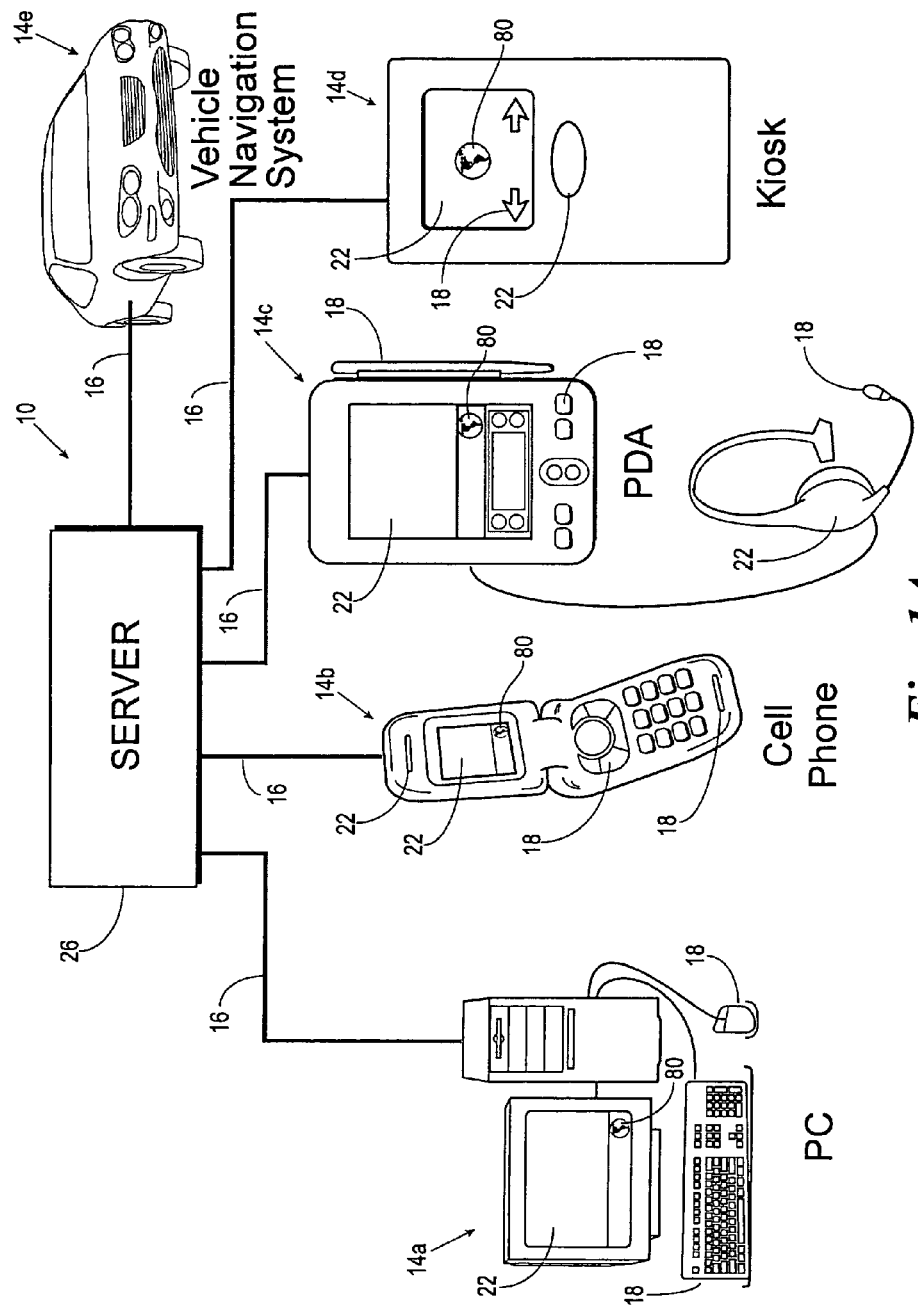
FIG. 1A shows a block diagram of a resource retrieval system having a server and a plurality of user systems, which is constructed in accordance with the present invention.

Referring now to the drawings, and in particular to FIG. 1A, shown therein and labeled by the reference numeral 10 is a resource retrieval system, which is constructed in accordance with the present invention. The resource retrieval system 10 electronically provides a plurality of categorizeable publications, such as publications which are categorizeable by region, i.e., region-based publications.

In one preferred embodiment, the resource retrieval system 10 provides a plurality of region-based publications which comprise a plurality of print telephone directories. Telephone directories are generally considered to be a region-based publication since each telephone directory is targeted to a specific region, such as for example a city or metro area located within different states or countries. Examples of such telephone directories are yellow pages and white pages telephone books.

Preferably, at least two of the telephone directories are associated with or published by different sources. Each source can be any type of entity, such as for example individuals, corporations, utilities, private organizations, or government entities, and can be located anywhere in the world. For example, one of the sources can be Southwestern Bell Communications. Another example source is Feist Publications, Inc. Other example sources are Seccion Amarilla (in Mexico), Shanghai Yellow Pages Advertising Company, Ltd. (in China), A&M Communications Pvt. Ltd. (in India), Phone Directories Co., Inc (in Canada), and Dumrath & Fassnacht KG (in Germany).

Each source can publish different types of telephone directories which are targeted toward more specific groups of telephone customers. For example, "yellow pages" publications generally include listing information, advertisements, coupons, etc., for commercial entities, and "white pages" publications generally include listing information for residential entities. As another example, a government agency may publish a directory which includes listing information for agency offices, departments and employees.

Further, preferably at least two of the telephone directories are applicable to different regions. However, it should be understood that two or more of the telephone directories can apply to overlapping regions. In one embodiment, the plurality of telephone directories are applicable to a plurality of regions in different countries so that the resource retrieval system 10 provides a generally worldwide collection of telephone directories.

While the present invention preferably utilizes multiple telephone directories that are published by at least two different sources and/or apply to different regions, it should be understood that the present invention contemplates that other restrictions can be placed on the telephone directories utilized in the resource retrieval system 10. For example, in one embodiment, only telephone directories having the highest usage may be utilized. As another example, only those telephone directories with the most credible and accurate information are utilized (as determined by a host of the resource retrieval system 10, an independent rating company, consumer surveys, etc.). Further, the telephone directories can be stored, searched, and so forth in a rotation that coincides with the actual print directory distribution dates in their given markets (e.g., by day, month and year). It is also contemplated that the telephone directories available in the database will be continuously updated with the new versions of print directories as they are published and distributed locally, or prior to the actual physical distribution of the print directories.

Although the present invention is described in one preferred embodiment with respect to telephone directories, it should also be understood that the present invention contemplates that other region-based publications or directories can be utilized. For example, the region-based publications can be television program listings, such as published by Cox Communications or Multimedia Cablevision. As another example, the region-based publications can be government resources, manuals, pamphlets, forms, guidelines, public service announcements, etc. as published by the various local, state and federal government agencies. As yet another example, the region-based publications can be advertising books targeting different markets and/or geographic areas. Further examples of region-based publications include newspapers, or religious or educational materials published in different languages or targeted toward different geographic and/or cultural areas.

Further, it should also be understood that the present invention is not limited to only region-based publications, and that any catagorizeable publication in any form can be utilized in the present invention. For example, the publication can be categorized (or sub-categorized) by subject matter or any other appropriate category associated with the particular publication. For example, if the publications are one or more sets of encyclopedias, the alphabetic categories generally associated therewith can be utilized. If the publication relates to music (in written and/or audio form), the categories of rock, country, rap, pop, R&B, jazz, alternative, gospel, classical, etc., can be utilized.

As shown in FIG. 1A, the resource retrieval system 10 is in communication with at least one user system 14 (only five user systems 14 being shown in FIG. 1A and labeled as 14a, 14b, 14c, 14d and 14e for purposes of clarity and illustration). In general, each user system 14 is a computational device associated with a user of the resource retrieval system 10. Each user system 14 includes at least one input device 18 (e.g., a keyboard, a keypad, a touch-screen, a mouse, a trackball, a microphone, a camera, a speech recognition system, etc.) and at least one output device 22 (e.g., a monitor, a display, a speaker, a voice synthesizer, etc.). For example, one or more of the user systems 14 (such as user system 14a) can be a personal computer or laptop having a keyboard, mouse and monitor. As another example, one or more of the user systems 14 (such as user system 14b) can be a mobile phone having a keypad, microphone, and speaker. As a further example, one or more of the user systems 14 (such as user system 14c) can be a personal digital assistant (PDA) with a keypad, stylus, screen, speaker and microphone. As yet another example, one or more of the user systems 14 (such as user system 14d) can be a kiosk with a touch-screen monitor. Also, one or more of the user systems 14 (such as user system 14e) can be a vehicle navigational system (e.g., an OnStar system) with a touch-screen monitor, keypad, microphone, and speaker. Other example communication portals which can be utilized for the user systems 14 include, but not by way of limitation, mobile or hand held devices (e.g., cellular phones), stationary devices (e.g., public phone booths having a visual screen or display), vehicle or car phones, vehicle or car computer systems, home or business phones, and home or business computer systems. Further, it should be understood that the present invention should not be considered limited to existing communication portals and systems.

The resource retrieval system 10 communicates with the at least one user system 14 via at least one communication link 16. The communication link 16 is any suitable communication link which permits electronic communications, such as extra computer communication systems, intra computer communication systems, internal buses, local area networks, wide area networks, Internet networks, point to point shared and dedicated communications, infra red links, microwave links, telephone links, cable TV links, satellite links, radio links, fiber optic links, cable links and/or any other suitable communication system. Preferably, the communication link 16 is an Internet based link which allows electronic information to be transferred between the resource retrieval system 10 and the at least one user system 14 over the Internet so that the resource retrieval system 10 is available on a more global or ubiquitous basis.

In one embodiment, the resource retrieval system 10 provides the plurality of telephone directories to the user systems 14 via a server 26. The server 26 includes one or more computer systems (not shown) which are capable of transmitting information to and receiving information from the user systems 14. For example, the server 26 can include one or more general computers having a central processor unit (CPU), an I/O unit and a memory that stores data and various programs such as an operating system, one or more authoring applications (e.g., programs for word processing, creating spread sheets, and producing graphics), one or more client applications (e.g., programs for accessing online services), and one or more browser applications (e.g., programs for retrieving and viewing electronic documents from the Internet and/or Web). The resource retrieval system 10 may also include a communications device (e.g., a satellite receiver, a modem, or network adapter) for exchanging data through the at least one communications link 16.

For each telephone directory, the server 26 of the resource retrieval system 10 stores document information from which a digital replica of at least a portion of the printed telephone directory can be generated or otherwise provided. The document information includes data representative of text, images, graphics, or combinations thereof, for the telephone directory. The server 26 utilizes the document information to electronically generate a digital replica of at least a portion of the telephone directory, which is then transmitted to the user system 14 so as to allow the user to perceive contents of the telephone directory in an electronic format that substantially corresponds to the format found in the tangible or "hard copy" telephone directory as it was physically published.

For example, the document information for one of the telephone directories can include a portable document format (pdf) file created by scanning the physical pages of the telephone directory. As another example, the document information can include a "soft copy" file for the layout of the published version of the telephone directory. The file can be downloaded or otherwise collected from a publisher of the telephone directory. For example, the resource retrieval system 10 can be adapted to perform a periodic or continuous search of a system of the publisher to automatically retrieve and download electronic forms of the telephone directories to the server 26. Also, once the plurality of telephone directories are stored in an electronic format, the document information can be compressed or otherwise organized and represented to provide faster and more accurate searching within the contents of the telephone directory.

Although the content of a physical telephone directory is generally perceived visually, it should be understood that the present invention contemplates that the server 26 can be further adapted to receive and transmit audio data or other sensorial related information, and/or convert visual or textual information into another sensorial format. Sensorial data can include any data which can be utilized by the user system 14 to provide information to the user via the user's sense of sight, hearing, touch, smell, and/or taste. Further, although the content of a physical telephone directory is generally viewed in a static or stationary form, the present invention contemplates that the server 26 can be further adapted to transmit video, virtual, animated or other dynamically perceived information.

Further, although the present invention is described herein as digitally replicating telephone directories so as to allow the user to perceive the content of the telephone directory in a format that substantially corresponds to the format found in the tangible or "hard copy" telephone directory as it was physically published, it should be understood that the resource retrieval system 10 of the present invention can be adapted to allow portions of the document information of the telephone directories to be edited or changed. For example, the document information for the telephone directories can be updated periodically so as to include a new listing or a change in an existing listing, such as a changed telephone number or address, for example. The old information can be replaced by the new information in the electronically replicated telephone directory, or the new information can be shown separately and referred to by an indicator near the old information in the electronically replicated telephone directory.

For each user system 14, the operation of the resource retrieval system 10 is similar. Therefore, for purposes of brevity and clarity of understanding, the resource retrieval system 10 will generally be discussed in further detail below with respect to one user system 14.

Generally, the user associated with the user system 14 utilizes the user system 14 to access the server 26 and indicate to the server 26 which of the plurality of telephone directories (or portions thereof) the user wants to perceive. The server 26 then retrieves the document information for one or more telephone directories indicated by the user and transmits at least a portion of the document information to the user system 14 so as to provide a digital replica of at least a portion of the one or more telephone directories in a format perceivable by the user.

Figure 1B:
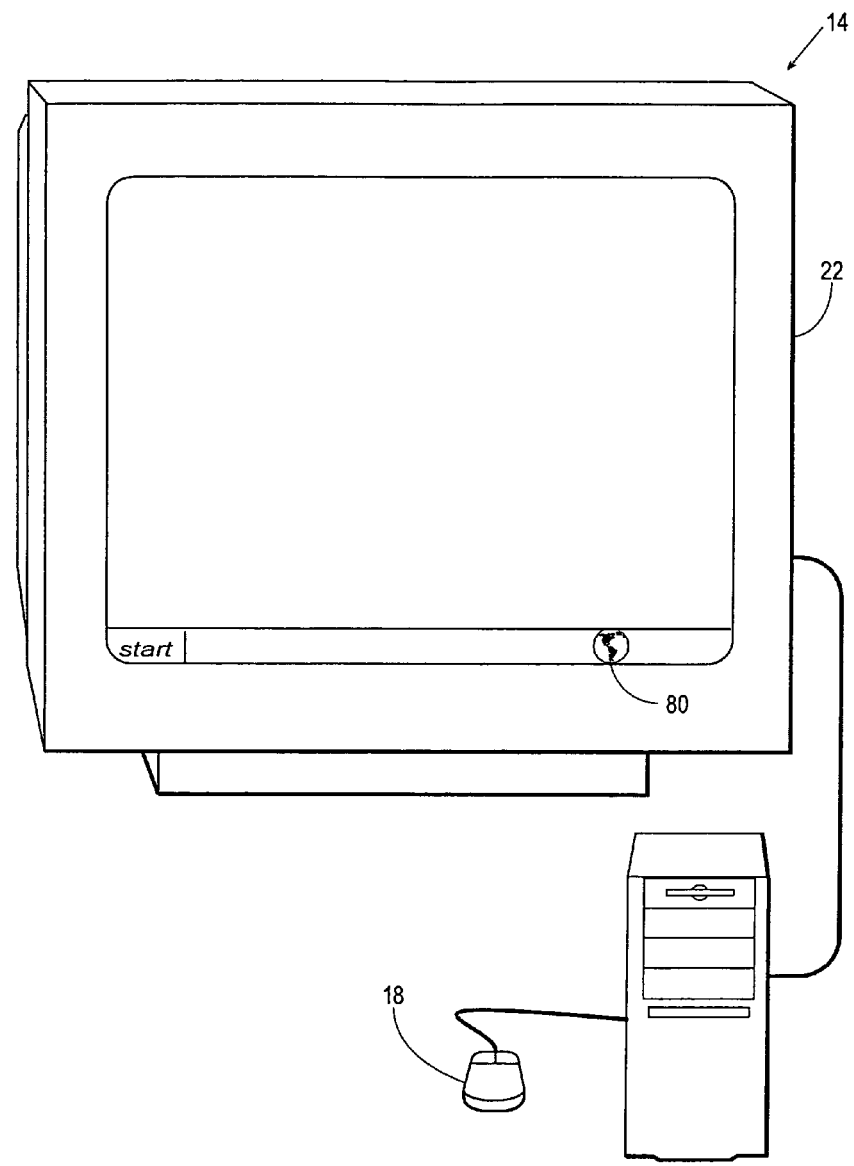
FIG. 1B shows a representation of one embodiment of an icon provided on a user system for directly accessing the server of the resource retrieval system.

Preferably, the server 26 is accessed via an icon 80 provided on the user system 14, as shown for example in FIG. 1B. Once installed from the original setup, the icon 80 automatically appears on the output device 18 every time the user system 14 is activated, started, or booted. The icon 80 is a symbolic representation of an instantaneous and direct connection between the user system 14 and the server 26. For example, the icon 80 can be "left clicked" to launch an interface provided by the server 26. Once the interface is provided on the at least one output device 22 of the user system 14, the user can then use the at least one input device 18 to "point and click" within the interface until a telephone directory of interest is found (as discussed further below). As such, the icon 80 allows for instantaneous retrieval of user desired or needed information from the server 26.

In one embodiment, the icon 80 is located in a lower location of the display, such as for example, but not limited to, a tool bar commonly associated at the bottom right of a computer screen. Preferably, the icon 80 is located on the display such that the icon 80 is visible to the user regardless of what program screen or application is currently in use on the user system 14. Also, the icon 80 can include a dynamic or moving image so as to draw attention or alert the user to the presence of the icon 80 on the user system 14. For example, the icon 80 can include an image of a globe which appears to rotate periodically or continuously. The icon 80 can be activated by pointing, clicking, pushing, touching, audibly identifying, or any other appropriate means for at least one input device 18 of the user system 14.

While the present invention is described above in one embodiment as including the icon 80, it should be understood that the server 26 of the present invention may be accessed by other access means, and the icon embodiment should not be considered as limiting the scope of the invention. For example, when the server 26 is established on the World Wide Web so as to be publically accessible using the http: protocol, the user can access the server 26 by initiating a web browser on the user system 14 and connecting to a web page or other web based program which is hosted by the server 26.

To facilitate the retrieval of document information by the server 26 for one or more of the telephone directories which the user wants to perceive, the server 26 further stores for each telephone directory a region identifier indicative of a geographical region of applicability for the telephone directory. For example, the region identifier can be indicative of at least one of a country, a state, a province, a county, a parish, a city, a town, or the like, for which the content of the telephone directory applies.

The user indicates to the server 26 which of the plurality of telephone directories the user wants to perceive by transmitting to the server 26, via the user system 14, a region input indicative of a location of interest. The server 26 utilizes the region input received from the user system 14 and the plurality of region identifiers stored by the server 26 to retrieve the document information for at least one telephone directory. In one embodiment, the server 26 searches the stored region identifiers associated with the plurality of telephone directories to locate at least one telephone directory having a region identifier which matches or most closely matches (within a predetermined threshold) the region input transmitted by the user system 14. The server 26 then retrieves the document information corresponding to the at least one matched telephone directory so that at least a portion of the document information can be transmitted to the user system 14.

Figure 2:
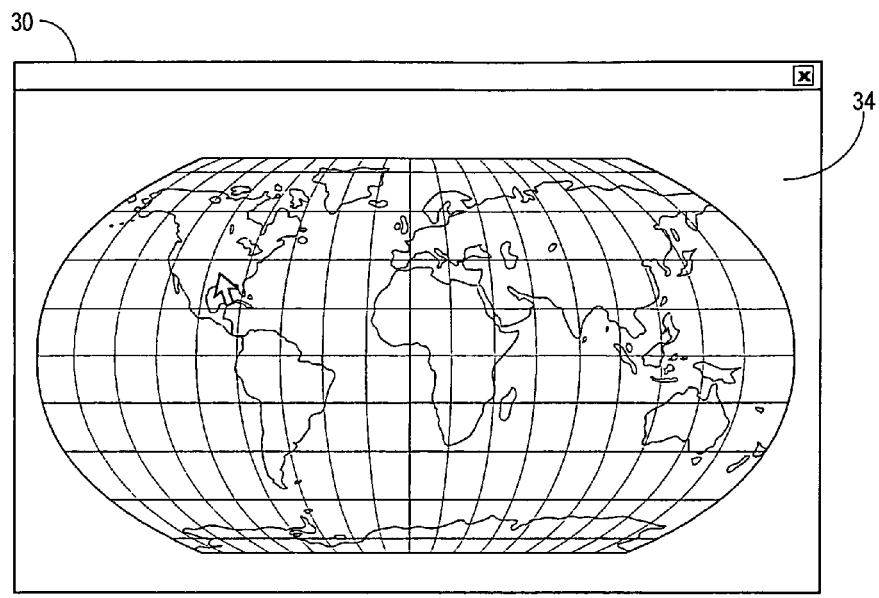
FIG. 2 shows a representation of one embodiment of a "World" window of an interface for the resource retrieval system.
Figure 3:
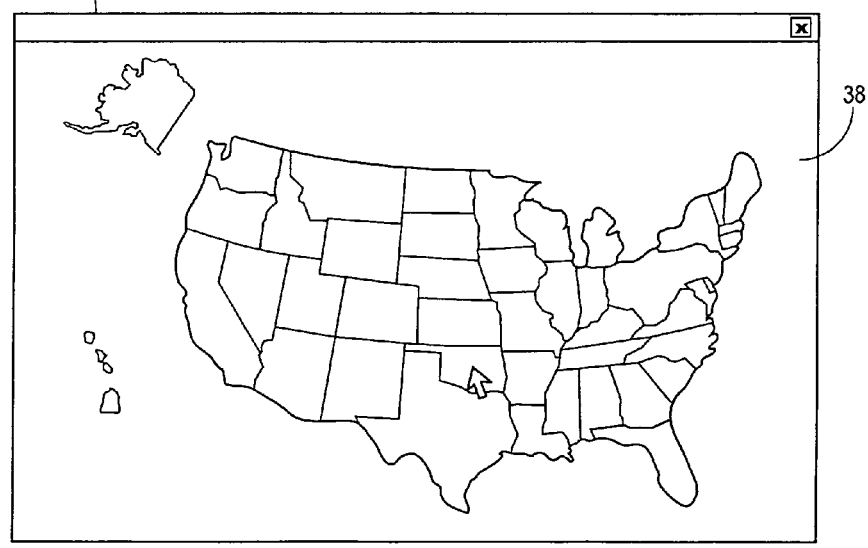
FIG. 3 shows a representation of one embodiment of a "Country" window of the interface for the resource retrieval system.
Figure 4:
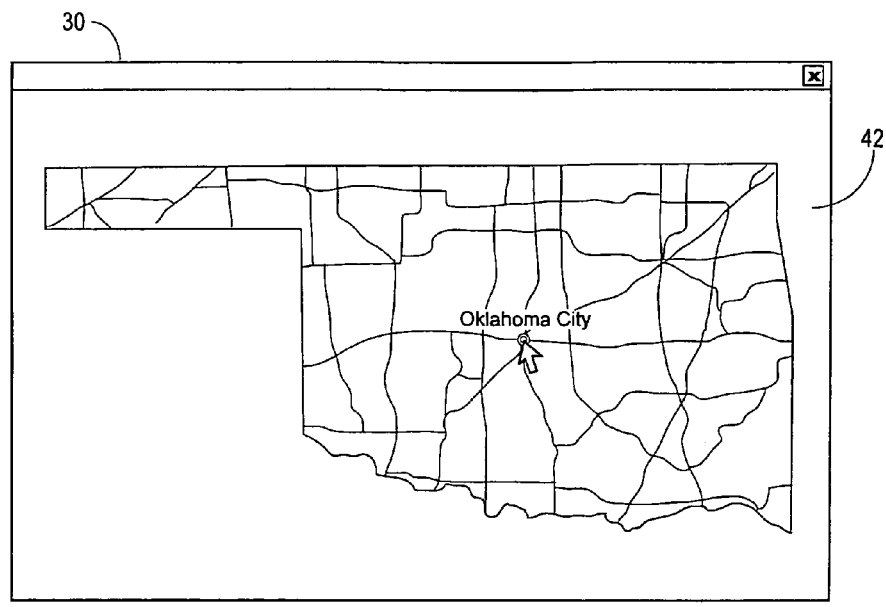
FIG. 4 shows a representation of one embodiment of a "State" window of the interface for the resource retrieval system.

In one embodiment, the region input is inputted into the user system 14 via an interface 30 provided by the server 26, such as shown for example in FIGS. 2-4. The interface 30 provides an interactive pictorial representation of the at least one geographic area which has a plurality of region inputs associated therewith which can be selected by the user and transmitted to the server 26.

In one embodiment, the interface 30 provides an interactive pictorial representation of a series of related geographic areas which allows the user to narrow or filter the plurality of region inputs from which the user can select. For example, as shown in FIG. 2, the interface 30 first provides an interactive "World" window 34 which pictorially represents the countries of the world from which the user can select. Once a country is selected, the interface 30 provides an interactive "Country" window 38, as shown for example in FIG. 3, which pictorially represents the divisions of a country (such as states, territories or provinces within the country) from which the user can select. Once a division is selected, the interface 30 provides an interactive "Divisions" window 42, as shown for example in FIG. 4, which pictorially represents the municipalities, such as cities or towns, within the division from which the user can select. Once a municipality is selected, the server 26 is provided with the region input resulting from the user's selection in the interface 30.

Once the region input is transmitted to the server 26 by the user system 14, the region input is utilized by the server 26 to search the stored region identifiers associated with the plurality of telephone directories to locate at least one telephone directory having a region identifier which matches or most closely matches the region input transmitted by the user system 14. The server 26 then retrieves the document information corresponding to the at least one telephone directory, and transmits at least a portion of the document information to the user system so as to provide a digital replication of at least a portion of the at least one telephone directory to the user.

Although the present invention is described in one embodiment as utilizing region input and region identifiers to retrieve the document information for at least one telephone directory to be transmitted to the user system 14, it should be understood that the present invention contemplates that the server 26 can considers other factors or combination of factors. For example, the server 26 can consider input and/or identifiers relating to a source or author name, a publication title, a publication date, a reliability rating, a popularity rating, or any such characteristic or quality associated with telephone directories. Further, for such types of inputs, an interface can be provided in a similar manner as that described above with reference to the interface 30 to facilitate the transmission of such input from the user systems 14.

Figure 5:
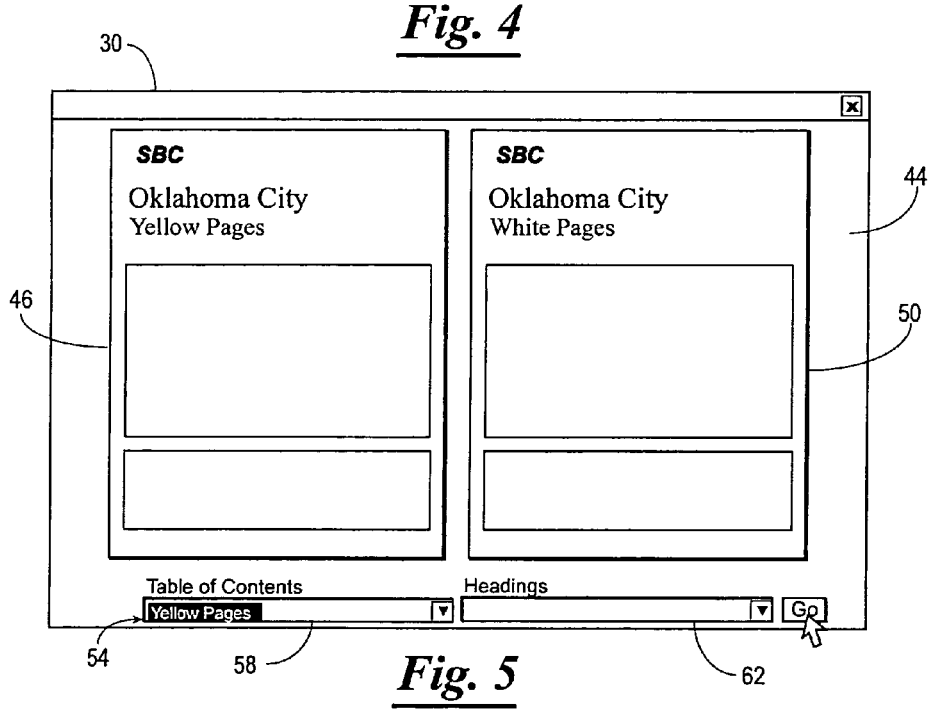
FIG. 5 shows a representation of one embodiment of a "Directories" window of the interface for the resource retrieval system.

In one embodiment, when two or more telephone directories are matched by the server 26, the interface 30 provides the user with an interactive "Directory" window 44, such as shown for example in FIG. 5, which pictorially represents the two or more telephone directories from which the user can select. The pictorial representation in the "Directory" window 44 can be for example a graphic which replicates a portion or each of the two or more telephone directories, as generated from the documentation information associated therewith. For example, if there is yellow pages telephone directory and a white pages telephone directory which have region identifiers that correspond to the region input received from the user system 14, then the "Directory" window 44 can include a "yellow pages" graphic 46 which replicates the front cover of the yellow pages telephone directory and a "white pages" graphic 50 which replicates the front cover of the white pages telephone directory, as shown for example in FIG. 5. As another example, if there is a metro area yellow pages telephone directory and one or more individual city yellow pages telephone directories which have region identifiers that correspond to the region input received from the user system 14, then the "Directory" window 44 can include graphics which replicates the front covers of the metro area telephone directory and each city telephone directory.

From the "Directory" window 44, the interface 30 allows the user to then select one of the available telephone directories, or portions thereof, the user wants to receive more information for and perceive. For example, using the at least one input device 18 of the user system 14, the user can select one of the graphical replicas of the front covers to indicate to the server 26 the selected telephone directory. However, the interface 30 can provide any type of input means which the user can utilize to indicate to the server 26 the the telephone directory, or portion thereof, the user wants to perceive. For example, the interface 30 can provide an input means which includes at least one of an entry field or a predetermined list in the form of a pull down menu bar, radio buttons, push buttons, linked text or images, or the like.

Figure 6:
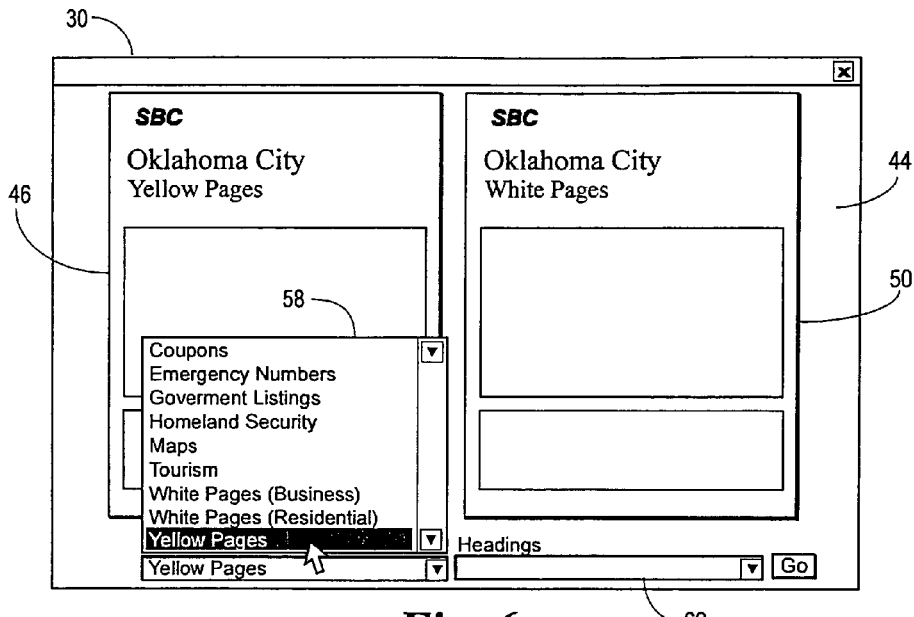
FIG. 6 shows in more detail a portion of a directory tool provided in the "Directories" window shown in FIG. 5.

In one embodiment, as shown for example in FIG. 6, the interface 30 provides a directory tool 54 which allows the user to indicate to the server 26 one of the telephone directories, or a specific category, heading, section or page associated with one of the telephone directories that the user wants to perceive. Preferably, the directory tool 54 is modeled in a manner that replicates the existing searching means or format for each of the telephone directories so as to allow searching and retrieving of information in a familiar format typically associated with the telephone directory. For example, the directory tool 54 can be modeled to parallel at least a portion of a table of contents, an index, a set of headings, or other format scheme associated with the printed telephone directory.

Figure 7:
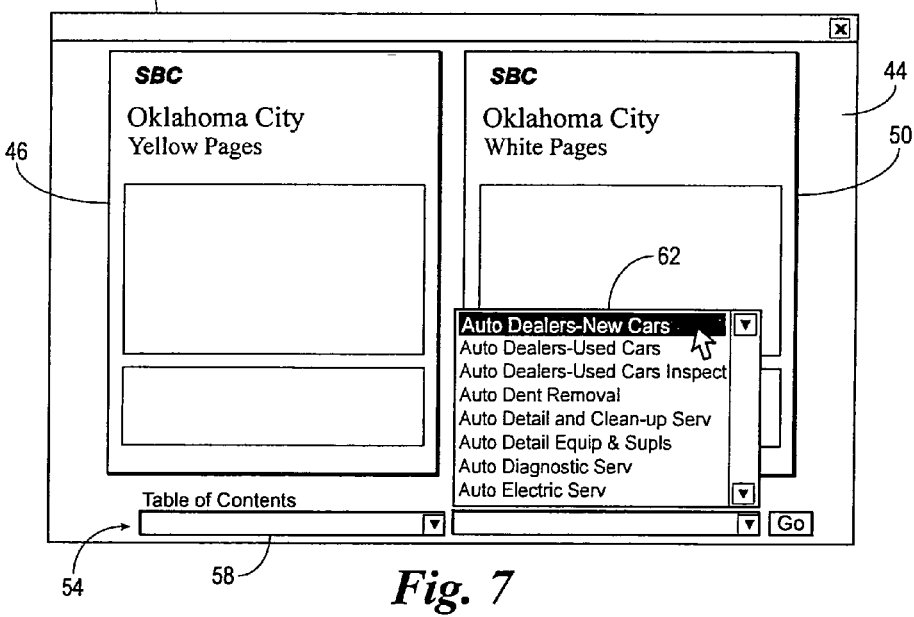
FIG. 7 shows in more detail another portion of the directory tool provided in the "Directories" window shown in FIG. 5.

In one embodiment, the directory tool 54 includes a "Table of Contents" pull down menu bar 58 which lists the available telephone directories from which the user can select. For example, as shown in FIG. 6, the "Table of Contents" pull down menu bar 58 can include an entry for "Yellow Pages," "White Pages (Business)" and "White Pages (Residential)." Further, the "Table of Contents" pull down menu bar 58 can also include entries which correspond to portions of the table of contents utilized in the telephone directories. For example, as shown in FIG. 6, such entries can correspond to the coupons, emergency numbers, government listings, homeland security, maps (including zip code maps and area code maps), and tourism sections of the printed telephone directories. Further, to facilitate the user in locating a particular section or portion within one of the telephone directories which the user wants to perceive, the directory tool 54 also includes a "Headings" pull down menu bar 62 which includes entries which correspond to the alphabetical headings utilized in the telephone directory (see also FIG. 7).

The input provided by the user via the interface 30, and more particularly the directory tool 54, is utilized by the server 26 to determine which portion of the document information to transmit to the user system 14, i.e., which portion of the telephone directory to digitally replicate and display to the user so that the user can perceive at least a portion of the telephone directory. In one embodiment, once the user has indicated to the server 26 which telephone directory, or portion thereof, the user wants to perceive, the interface 30 provides an interactive "Pages" window 66, as shown for example in FIG. 8. In the "Pages" window 66, a digital replication of at least a portion of the telephone directory selected by the user is provided. For example, if the user selects a "Yellow Pages" entry in the "Table of Contents" pull down menu bar 58, and then a "Auto Dealers-New Cars" entry in the "Headings" pull down menu bar 62 in the "Directory" window 44, a digital replica of the portion of the physical yellow pages telephone directory corresponding to that entry is displayed to the user in the "Pages" window 66, such as shown for example in FIG. 8. Preferably, the digital replica displayed to the user includes a predetermined number of pages of the printed telephone directory. Also, the pages are preferably formatted to a size which fits correctly on the at least one output device 22 of the user system 14 so as to simulate the prior existing print format.

The "Pages" window 66 is interactive in that the user is allowed to scroll between pages of the digitally replicated telephone directory, scroll within the page or pages currently displayed, search for text within the contents of the telephone directory, copy text, zoom in or out, or perform other like viewing functions. Also, the interface 30 can provide the directory tool 54 described above to allow the user to indicate to the server 26 a new telephone directory, or another category, heading or page within the telephone directory which the user wants displayed in the "Pages" window 66.

Figure 8:
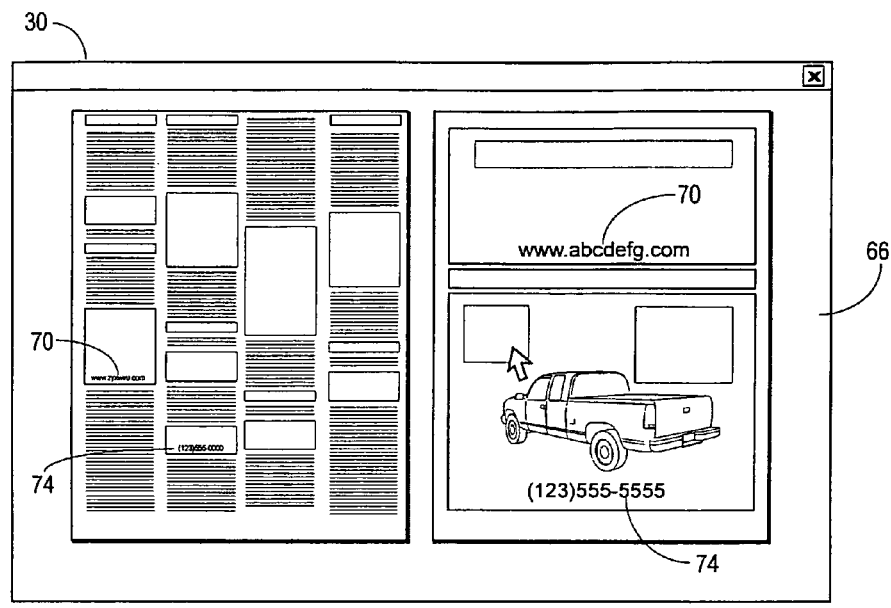
FIG. 8 shows a representation of one embodiment of a "Pages" window of the interface for the resource retrieval system.
Figure 9:
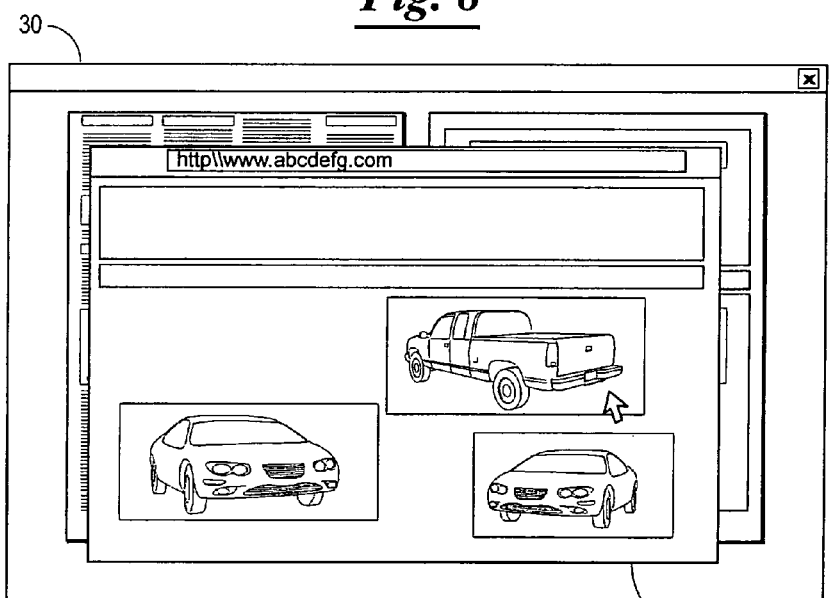
FIG. 9 shows a representation of one embodiment of a web browser connected to a web page by the resource retrieval system.

Further, in one embodiment, the "Pages" window 66 includes one or more Internet links 70 (only two being labeled in FIG. 8 for purposes of clarity). The Internet links 70 correspond to Internet addresses that are included in the content of the one or more pages being currently displayed in the "Pages" window 66. When the user selects one of the Internet links 70, the server 26 opens a web browser 72 or other appropriate program which accesses or connects to the Internet address for the user, as shown for example in FIG. 9. In one embodiment, to provide the Internet links 70, the server 26 identifies text which is representative of an Internet address within the document information for the pages of the telephone directory.

Also, in one embodiment, the "Pages" window 66 further includes one or more telephone links 74 (only two being labeled in FIG. 8 for purposes of illustration and clarity). The telephone links 74 correspond to telephone numbers that are included in the content of the one or more pages being currently displayed in the "Pages" window 66. When the user selects one of the telephone links 74, the server 26 transmits data representative of the telephone number to the user system 14 or other device so as cause the user system 14 or other device to place a call and connect to the telephone number for the user. In one embodiment, to provide the telephone links 74, the server 26 identifies text which is representative of a telephone number within the document information for the pages of the telephone directory.

Text recognition by the server 26 can also be utilized for other functions. For example, if the telephone directory is in a language foreign to the user or if the user prefers a certain language, the "Pages" window 66 can further include a translator program or tool (not shown) which translates the text of the telephone directory to another language. For example, the text of the entire page or pages being currently displayed in the "Pages" window 66 can be translated into another language, or the user can select text which the user wants translated. As another example function, the "Pages" window can include a text-to-voice program or tool (not shown) which provides text selected by the user in an audio format. Such a feature can be used for example if the user wants to have a telephone number read aloud as the user enters the telephone number into a telephone or other communication device.

In one embodiment, the "Pages" window 66 further provides a printing tool (not shown) which can be utilized by the user to print out at least a portion of the telephone directory. The print out can be a hard copy (e.g., on paper), or can be a soft copy (e.g., as an email or file saved internal or external to the user system 14). For example, if the user system 14 includes at least one output device 22 which is a printer, the user can utilize the printing tool to select a page, a listing, an ad, a coupon, or other portion of the telephone directory which the user wants to send to the output device 22 to be printed out.

Figure 10:
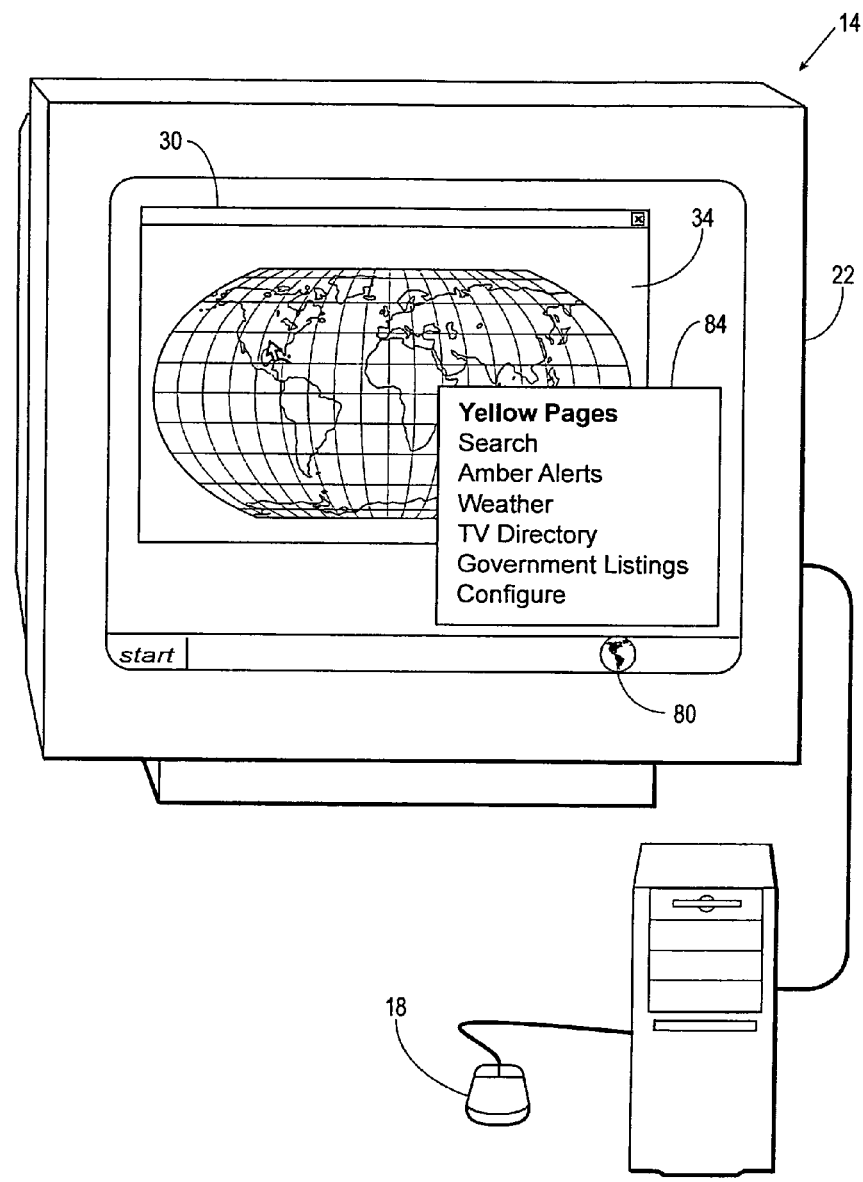
FIG. 10 shows a representation of one embodiment of an infotray for the resource retrieval system.

As discussed above, the server 26 is preferably accessed via the icon 80. In one embodiment, when the user activates the icon 80 (e.g., by "left clicking" the icon 80), the interface 30 is launched and provides the "World" window 34 on the at least one output device 22 of the user system 14, such as shown in FIG. 10. The user can then use the at least one input device 18 to "point and click" to a geographic area that is desired to be searched, and so on until a telephone directory of interest is found (as discussed above).

In one embodiment, the icon 80 is further used to provide access to other information or Internet services (independent of or concurrently with the accessing of the server 26). For example, as shown in FIG. 10, the icon 80 can provide an infotray 84 or dialog box, or other like tool, which displays the Internet services the user can select from. The infotray 84 can be activated by "right clicking" or giving any other appropriate indication via the input device 18 of the user system 14. The Internet services provided in the infotray 84 can be organized in different categories and subcategories, and changed or updated periodically. Such Internet services can be any computer-to-computer or machine-to-machine service over the Internet, such as for example a search field or link for a search engine, a banner or other type of display of information, or a link which opens a web browser and connects to a predetermined or inputted Internet address. For example, the infotray 84 can provide banners and/or links that correspond to public service announcements (e.g., Amber Alerts or homeland security warnings), weather information and alerts, news headlines, or the like. Also, the infotray 84 can provide banners and/or links that correspond to advertisements or special events. Such banners or links may include or link to specific promotional materials, ads, promotions, commercials or web sites that companies have produced or are otherwise associated with the companies.

The information contained in the infotray 84 can include any and all types of information available on a local, regional, national, international and worldwide bases. Each entry can be placed permanently or temporarily. It is also contemplated that archived, current or future radio or TV commercials, or any print advertisement may be automatically activated or selectively activated with the user's selection in the infotray 84. It is further contemplated that advertisers may pay for these automated or selectively activated promotional occurrences. Also, the information contained in the infotray 84 can be determined by the host server and/or set by the user (e.g. vis a configure tool).

Also, in one embodiment, one of the Internet services included in the infotray 84 is another icon or link from which a secondary interface is accessed. The secondary interface is similar to the interface 30, but is directed to a different type of region-based or otherwise categorizeable publication. For example, if the interface 30 relates to public telephone directories, the secondary interface can relate to government telephone directories, government resources or television directories. The secondary interface can be provided by the server 26, or by another server included in or independent of the resource retrieval system 10.

The present invention contemplates that the resource retrieval system 10, or components thereof, can be provided to any number of types of users. For example, the publications provided by the resource retrieval system 10 can be directed to and selectively accessed by specified groups or sub groups, such as a designated government entities, companies, churches, and so forth.

It is also contemplated that the resource retrieval system 10 can be assessable freely as a public utility, or as a service charged to the user and/or publishers. For the embodiment wherein the resource retrieval system 10 is freely assessable, the region-based publications are preferably freely distributed or publically owned publications so that access to such publications via the resource retrieval system 10 does not significantly affect the regular publishing of the publication in tangible form by its source. However, when the resource retrieval system 10 is accessable based on a service charge, the access to the region-based publication can be paid for by the user and/or publisher. For example, the user can be charged on a per-use, a per-publication accessed, a time frame or a subscription bases, or under any other appropriate billing means. As another example, the service can be charged to the publishers on a per-user, per-retrieval or subscription bases, or under any other appropriate billing means.

In one embodiment, the resource retrieval system 10 has registered publisher members or subscribers who opt in or pay to have their publications included in the system. The resource retrieval system 10 can further provide each publisher member with access to information relating to other publisher members, or generate and provide information regarding user requests, demographics, or other marketing information. It is further contemplated that other marketing methods may be incorporated into the resource retrieval system 10, such as for example referral fees, awards, bonuses, benefits and the like.

Further, the present invention contemplates that software developers kits (SDKs) can be designed so as to allow the products of the present invention to be produced or modified by others, e.g., licensees. The SDK allows a programer or software developer of the licensee to produce a specific implementation of the resource retrieval system 10. This allows the end programs created with the assistance of the SDK to be tailored to the licencee's specific client needs and areas of interest. The SDKs are preferably targeted toward the specific developer licensee (rather than the end user) and enables the licensee to customize and configure the resource retrieval system 10 (and user interfaces) to suit a target market as desired by the licensee. The licensee can then sub-license its specific implementation to the end user.

From the above description, it is clear that the present invention is well adapted to carry out the objects and to attain the advantages mentioned herein, as well as those inherent in the invention. Although the foregoing invention has been described in some detail by way of illustration and example for purposes of clarity of understanding, it will be apparent to those skilled in the art that certain changes and modifications may be practiced without departing from the spirit and scope of the present invention, as described herein. As such, those skilled in the art will appreciate that the conception upon which this disclosure is based may readily be utilized as a basis for the designing of other structures, methods, and systems for carrying out the several purposes of the present invention. As such, it should be understood that the invention is not limited to the specific and preferred embodiments described herein, including the details of construction and the arrangements of the components as set forth in the above description or illustrated in the drawings. Also, the claims should be regarded as including equivalent constructions insofar as they do not depart from the spirit and scope of the present invention. Further, it should be understood that the phraseology and terminology employed herein are for the purpose of description and should not be regarded as limiting.

What is claimed is:

1. A method for providing a plurality of digital replicas of physical region-based publications to a user system, the method comprising the steps of:

storing, for each physical region-based publication, document information from which a digital replica of at least a portion of the physical region-based publication can be provided;

storing a region identifier for each document information corresponding to the region in which the physical region-based publication is targeted;

receiving a region input indicative of a location of interest from the user system;

utilizing the region input and the plurality of region identifiers to retrieve the document information for at least two physical region-based publications;

transmitting to the user system at least a portion of the document information indicative of the at least two physical region-based publications associated with the location of interest;

receiving from the user system a selection of at least one of the at least two physical region-based publications; and transmitting at least a portion of the document information to the user system so as to allow a user of the user system to perceive the selected physical region-based publication in an electronic format that substantially corresponds to the format found in the physical region-based publication as it was physically published.

2. The method of claim 1, wherein the plurality of physical region-based publications are telephone directories.

3. The method of claim 1, wherein the at least two physical region-based publications are from different sources.

4. The method of claim 1, wherein the digital replica of at least a portion of the selected physical region-based publication includes information indicative of an Internet address and the method further comprises the step of transmitting a link to the Internet address to the user system.

5. The method of claim 1, wherein the digital replica of at least a portion of the at least one physical region-based publication includes information indicative of a phone number, and the method further comprises the step of transmitting a link to the phone number to the user system.

6. The method of claim 1, wherein the step of storing, for each physical region-based publication, document information comprises inputting the document information for each physical region-based publication into a server using a software developer's kit.

7. The method of claim 1, wherein the step of storing a region identifier for each physical region-based publication comprises inputting the region identifier for each physical region-based publication into a server using a software developer's kit.

\* \* \* \* \*